United States Patent
Zhao et al.

(10) Patent No.: US 9,326,165 B2
(45) Date of Patent: Apr. 26, 2016

(54) METHOD, DEVICE, RADIO NETWORK CONTROLLER AND CHIP FOR IMPROVING NETWORK QUALITY

(71) Applicant: Huawei Technologies Co., Ltd., Shenzhen, Guangdong (CN)

(72) Inventors: Yinwei Zhao, Shenzhen (CN); Wei Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 14/186,708

(22) Filed: Feb. 21, 2014

(65) Prior Publication Data

US 2014/0169278 A1  Jun. 19, 2014

Related U.S. Application Data

(63) Continuation of application No. PCT/CN2012/077463, filed on Jun. 25, 2012.

(30) Foreign Application Priority Data

Aug. 26, 2011  (CN) .......................... 2011 1 0246879

(51) Int. Cl.
*H04L 1/00*  (2006.01)
*H04W 24/02*  (2009.01)
(Continued)

(52) U.S. Cl.
CPC ............... *H04W 24/02* (2013.01); *H04B 7/022* (2013.01); *H04J 11/0053* (2013.01)

(58) Field of Classification Search
CPC ..... H04W 80/04; H04W 80/05; H04W 80/06; H04W 80/07; H04W 80/08; H04W 72/04; H04W 72/05; H04W 72/06; H04W 84/12; H04W 84/13; H04W 84/14; H04W 84/15; H04W 84/16

USPC .................................................. 370/328–338
See application file for complete search history.

(56) References Cited

U.S. PATENT DOCUMENTS

2010/0246548 A1 *  9/2010  Bahng et al. .................. 370/338

FOREIGN PATENT DOCUMENTS

| CN | 1222046 A | 7/1999 |
| CN | 101778438 A | 7/2010 |

(Continued)

OTHER PUBLICATIONS

"3rd Generation Partnership Project; Technical Specification Group Radio Access Network; Radio Resource Control (RRC protocol specification (Release 1999)," 3GPP TS 25.331, V3.21.0, 3rd Generation Partnership Project, Valbonne, France (Dec. 2004).

(Continued)

*Primary Examiner* — Dady Chery
(74) *Attorney, Agent, or Firm* — Leydig, Voit & Mayer, Ltd.

(57) ABSTRACT

Embodiments of the present disclosure provide a method, device, radio network controller and chip for improving network quality. A signal of a user in a serving cell, detected by the same-frequency cell adjacent to the serving cell, is combined with a signal detected by the serving cell using a MCJD technology, so as to improve the signal quality of the user in the serving cell. The method of the present disclosure comprises: obtaining a first signal which belongs to a user terminal of a first cell and is detected by a base station of at least one second cell; combining the first signal with a second signal of the user terminal detected by a base station of the first cell to obtain a third signal; sending the third signal to a radio network controller. Therefore, the signal quality of the user in the first cell can be improved.

9 Claims, 5 Drawing Sheets

(51) Int. Cl.
*H04J 11/00* (2006.01)
*H04B 7/02* (2006.01)

(56) References Cited

FOREIGN PATENT DOCUMENTS

| | | |
|---|---|---|
| CN | 101990301 A | 3/2011 |
| CN | 102142889 A | 8/2011 |
| EP | 2107848 A1 | 10/2009 |
| JP | 2008507173 A | 3/2008 |
| JP | 2008547253 A | 12/2008 |
| JP | 2009246965 A | 10/2009 |
| WO | WO 2005062636 A1 | 7/2005 |
| WO | WO 2006008591 A1 | 1/2006 |
| WO | WO 2006133631 A1 | 12/2006 |
| WO | WO 2010031205 A1 | 3/2010 |

OTHER PUBLICATIONS

Sawahashi et al., "Coordinated Multipoint Transmission/Reception Techniques for LTE-Advanced," IEEE Wireless Communications, Institute of Electrical and Electronics Engineers, New York, New York (Jun. 2010).

\* cited by examiner

METHOD, DEVICE, RADIO NETWORK
CONTROLLER AND CHIP FOR IMPROVING
NETWORK QUALITY

CROSS-REFERENCE TO RELATED APPLICATIONS

This application is a continuation of International Patent Application No. PCT/CN2012/077463, filed on Jun. 25, 2012, which claims priority to Chinese Patent Application No. 201110246879.4, filed on Aug. 26, 2011, both of which are hereby incorporated by reference in their entireties.

TECHNICAL FIELD

The present disclosure relates to the field of communications, in particular to methods, devices, and radio network controllers and chips for improving network quality.

BACKGROUND

With the increase of popularity of a Time Division-Synchronization Code Division Multiple Access (TD-SCDMA) network, how to make the network better meet the requirements of users and promote the feeling of the users is a problem required to be solved in the construction of the TD-SCDMA mobile network. Because the performance of the TD-SCDMA network is mainly restricted by the receiving performance of an uplink, to improve the receiving performance of a TD-SCDMA uplink is a key of improving the performance of the whole network.

In the prior art, the signal quality of an uplink of a TD-SCDMA network is mainly improved in a networking mode. The method for improving the signal quality of the uplink in the networking mode includes: adding an antenna in a weak coverage area to improve the signal quality of the weak coverage area. The antenna is required to be added in the weak coverage area in such a mode to enlarge the coverage range, and seamless coverage of the network is still difficult to realize in the mode of adding antennas, due to the influence of the coverage distance of the antenna and blocking of surrounding buildings. Thus, the problem of weak signal quality of the uplink cannot be solved in this manner.

Although the aforementioned method may improve the signal quality of the uplink to a certain extent, it still cannot radically solve the technical problems of call drop and single call of network users and low switching success rate due to weak signal quality of the TD-SCDMA uplink at present.

SUMMARY

Methods and systems for improving network performance are provided in the embodiments of the present disclosure, by combining a first signal which belongs to a user terminal of a first cell and is detected by a base station of a second cell with a second signal of the user terminal detected by a base station of the first cell, may improve the signal quality of the user terminal.

In order to achieve the aforementioned objective, the embodiments of the present disclosure adopt the following technical solution.

At one aspect, the embodiments of the present disclosure provides a method for improving signal quality, including:

obtaining a first signal which belongs to a user terminal of a first cell and is detected by a base station of at least one second cell;

combining the first signal with a second signal of the user terminal detected by a base station of the first cell to obtain a third signal; and sending the third signal to a radio network controller.

The embodiments of the present disclosure further provide a method for improving network signal quality, including:

a radio network controller obtains a first signal which belongs to a user terminal of a first cell and is detected by a base station of at least one second cell;

the radio network controller obtains a second signal of the user terminal detected by a base station of the first cell; and the radio network controller combines the first signal with the second signal to obtain a third signal.

At another aspect, the embodiments of the present disclosure further provide a device for improving signal quality, including:

a first processor, used for obtaining a first signal which belongs to a user terminal of a first cell and is detected by a base station of at least one second cell;

a second processor, used for combining the first signal with a second signal of the user terminal detected by a base station of the first cell to obtain a third signal; and a sender, used for sending the third signal to a radio network controller.

At yet another aspect, the embodiments of the present disclosure further provide a radio network controller, including:

a first processor, used for obtaining a first signal which belongs to a user terminal of a first cell and is detected by a base station of at least one second cell, and used for obtaining a second signal of the user terminal detected by a base station of the first cell; and a second processor, used for combining the first signal with the second signal to obtain a third signal.

At yet another aspect, the embodiments of the present disclosure further provide a chip, including:

a first processing module, used for obtaining a first signal which belongs to a user terminal of a first cell and is detected by a base station of at least one second cell, and used for obtaining a second signal of the user terminal detected by a base station of the first cell; and a second processing module, used for combining the first signal with the second signal to obtain a third signal.

Compared with the prior art, in the technical solution provided in the embodiments of the present disclosure, the first signal which belongs to the user terminal of the first cell and is detected by the base station of the second cell is combined with the second signal of the user terminal detected by the base station of the first cell, so that the signal quality of the user terminal is improved and the technical problems of call drop and single call of network users and low switching success rate are solved.

BRIEF DESCRIPTION OF DRAWINGS

In order to illustrate the technical solutions in the embodiments of the present disclosure or in the prior art more clearly, a brief introduction to the accompanying drawings which are needed in the description of the embodiments or the prior art is given below. Apparently, the accompanying drawings described below are merely some embodiments of the present disclosure, based on which other drawings can be obtained by those ordinary skilled in this art without any inventive efforts.

DESCRIPTION OF EMBODIMENTS

A method, a device, a radio network controller and a chip for improving signal quality provided in the embodiments of the present disclosure, by combining a first signal which belongs to a user terminal of a first cell and is detected by a base station of a second cell with a second signal of the user terminal detected by a base station of the first cell, may improve the signal quality of the user terminal and solve the technical problems of call drop and single call of network users and low switching success rate due to poor signal quality of the user terminal.

The technical solutions in the embodiments of the present disclosure will be described clearly and completely below in conjunction with the accompanying drawings in the embodiments of the present disclosure. Apparently, the described embodiments are only part of the embodiments of the present disclosure, not all of them. Based on the embodiments of the present disclosure, all the other embodiments obtained by those ordinary skilled in this art without any inventive efforts shall fall into the protection scope of the present disclosure.

Embodiment I

Figure 1:
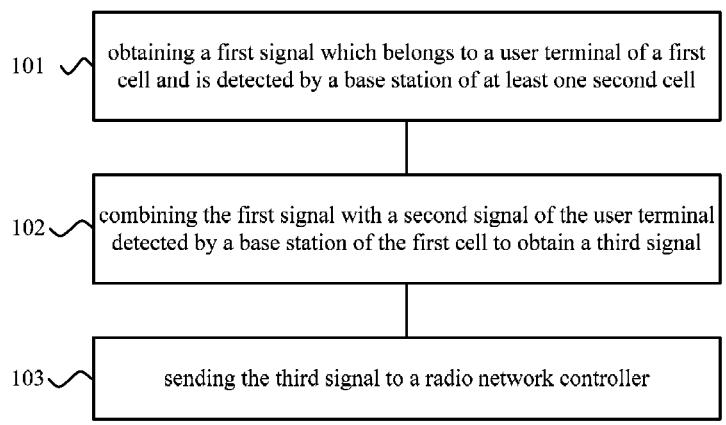
FIG. 1 is a flowchart illustrating an embodiment of the method for improving signal quality provided in the present disclosure.

An embodiment of the present disclosure provides a method for improving signal quality, as shown in FIG. 1, including:

step 101: obtaining a first signal which belongs to a user terminal of a first cell and is detected by a base station of at least one second cell;

step 102: combining the first signal with a second signal of the user terminal detected by a base station of the first cell to obtain a third signal;

step 103: sending the third signal to a radio network controller.

In order to better understand the technical solutions of the present disclosure, the embodiments below will be described by taking User Equipment (UE) as the user terminal.

Suppose that the first cell is a serving cell of a UE, and the second cell is a cell adjacent to the first cell. Because frequency point resources are limited, the second cell probably adopts the same frequency point as the first cell. Therefore, the base station of the serving cell may receive signals from a UE in the second cell with the same frequency point as the serving cell besides signals of the UE in the serving cell. Because the signals from the UE in the second cell may interfere with the signals of the UE in the serving cell, the UE in the second cell is generally named as an interfering UE.

Figure 2:
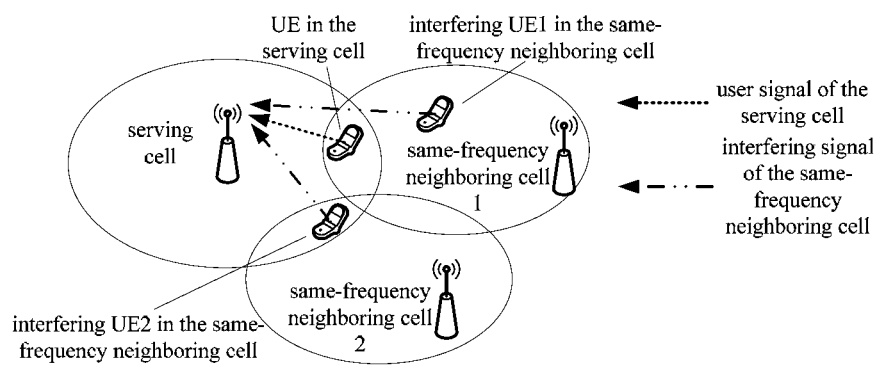
FIG. 2 is a network topological diagram illustrating an embodiment of a multi-cell joint detection (MCJD) provided in the present disclosure.

In order to describe conveniently, the second cell with the same frequency point as the first cell is named as a same-frequency neighboring cell in the present embodiments. For example, as shown in FIG. 2, the serving cell of the UE has two same-frequency neighboring cells, namely a same-frequency neighboring cell 1 and a same-frequency neighboring cell 2. The interfering UE1 belongs to the same-frequency neighboring cell 1, and the interfering UE2 belongs to the same-frequency neighboring cell 2. When the serving cell receives the signals of the UE, the serving cell also receives the signals from the interfering UE1 and the interfering UE2. The base station of the service cell may eliminate the interference of the received signals through a multi-cell joint detection (MCJD) method in the prior art, namely eliminate the signals of the interfering UE1 and the interfering UE2. Thus, the signals of the UE in the serving cell can be obtained.

Likewise, the base station of the same-frequency neighboring cell 1 or the base station of the same-frequency neighboring cell 2 may also obtain the signals from the UE in the serving cell through the MCJD method in the prior art.

In order to improve the signal quality of the UE in the serving cell, in the embodiment, the signals of the UE detected by the base station of the serving cell may be combined with the signals of said UE detected by the base station of the same-frequency neighboring cell 1 and the base station of the same-frequency neighboring cell 2. The quality of the combined signals is apparently superior to that of the signals of the UE previously and separately detected by the base station of the serving cell.

The aforementioned second cell and the first cell may be connected to a same base station or different base stations.

In the aforementioned step 102, combining the first signal with the second signal of the user terminal detected by the base station of the first cell to obtain the third signal, specifically including:

combining the signal with the highest signal strength in the first signals detected by the base stations of all the second cells with the second signal to obtain the third signal.

For example, suppose that the signal of the UE detected by the base station of the aforementioned same-frequency neighboring cell 1 is signal 1, the signal of the UE detected by the base station of the same-frequency neighboring cell 2 is signal 2, and the signal strength of the signal 1 is higher than that of the signal 2. In order to simplify the calculation quantity, only the signal of the UE detected by one same-frequency neighboring cell may be selected to be combined with the signal of the UE detected by the serving cell. In the present embodiment, the signal with the highest signal strength, namely signal 1, may be preferably selected to be combined with the signal of the UE detected by the base station of the serving cell, so as to obtain the third signal.

In the present embodiment, the step of combining the signal with the highest signal strength in the first signals detected by the base stations of all the second cells with the second signal to obtain the third signal may be realized in the following manner:

receiving $RSCP_{Adge}$ sent by the radio network controller, wherein the $RSCP_{Adge}$ is the one with the maximum value selected, by the radio network controller, from received signal code powers (RSCPs) sent by the base stations of all the second cells, and the RSCP is received signal code power of the signal of the base station of the second cell measured by the base station of the second cell when the base station of the second cell receives the signal of the user terminal;

combining the signal of the user terminal, which is detected by the base station of the second cell corresponding to the $RSCP_{Adge}$ and serves as the first signal, with the second signal to obtain the third signal.

The base station of the first cell and the base station of at least one second cell obtain the second signal and the first signal of the user terminal through MCJD respectively.

In the aforementioned step 103, the base station of the first cell sends the third signal to the radio network controller, including:

the base station of the first cell packages the third signal into a frame and then sends it to the radio network controller.

The method provided in the present embodiment may be performed by the base station of the first cell or other entities except the base station of the first cell and the radio network controller.

If the method provided in the present embodiment is performed by the other entities except the base station of the first cell and the radio network controller, the method further includes:

obtaining the second signal of the user terminal detected by the base station of the first cell.

The method is illustrated below through more specific examples.

Figure 3:
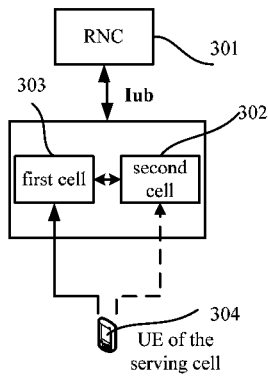
FIG. 3 is a principle schematic view illustrating the embodiment I of the method provided in the present disclosure.

As shown in FIG. 3, in the present embodiment, suppose that the first cell 303 is a serving cell of UE 304, the second cell 302 is a same-frequency neighboring cell of the first cell 303, and the second cell here may include one or more cell. In order to understand conveniently, only one second cell is taken as an example for illustration in this embodiment, and the signals of the UE 304 may reach the base station to which the second cell 302 belongs. The base station of the second cell 302 may receive not only the signals of the UE in the second cell but also the signals from the UE 304. Therefore, for the second cell 302, the UE 304 is an interfering UE of the second cell 302, and the base station of the second cell may obtain the signals of the UE 304 through MCJD.

The base station of the first cell 303 also can obtain the signals of the UE 304 through MCJD. Thus, through combining the signals of the UE 504, obtained by the base station of the second cell 302 and the base station of the first cell 303, the signal quality of the UE 304 can be improved.

In the presence of a plurality of same-frequency neighboring cells, namely a plurality of second cells 302 adjacent to the first cell 303, the signal of the UE 304 received by the base station of each second cell 302 may be detected through MCJD, and through combining the signals of the UE 304 detected by the base stations of all the second cells 302 with the signals detected by the base station of the first cell 303, the signal quality of the UE 304 may be improved.

The aforementioned method may be performed by the base station of the first cell or other entities except the base station of the first cell and the radio network controller. The first cell and the second cell may belong to the same base station or different base stations.

In the present embodiment, in the presence of a plurality of second cells 302, all of the base stations of these second cells 302 may receive the signals from the UE 304 in the serving cell, and the UE 304 may also receive the signals sent by the base stations of the second cells 302 and measure the RSCPs of the signals from the base stations of the second cells. The UE 304 may send the measured RSCPs to the corresponding base stations of the second cells 302, and the base stations of the second cells 302 will send the received RSCPs to the radio network controller (RNC). The RNC may select the one with the maximum value, marked as $RSCP_{Adge}$, according to the received RSCPs, and combine the signals of the UE 304 of the serving cell detected by the base station of the second cell 302 corresponding to the $RSCP_{Adge}$ with the signals of the UE 304 detected by the base station of the first cell 303. In this way, the signals of the UE 304 of the serving cell detected by the base stations of those second cells 303 which receive weak signals of the UE 304 of the serving cell are abandoned, so that the calculation quantity during combining is reduced.

Preferably, the aforementioned method may be performed by the base station of the first cell or other entities except the base station of the first cell and the radio network controller, and the combined signals may be packaged into a frame and then sent to the RNC.

Information of a plurality of same-frequency neighboring cells, namely information of second cells adjacent to the first cell and with the same frequency as the first cell, may be configured for the first cell.

The RNC configures same-frequency neighboring cell information for the first cell 303, and the same-frequency neighboring cell information includes neighboring cell code tree information, indication information for indicating code tree resources occupied by neighboring cell users and neighboring cell scrambling code information.

Figure 4:
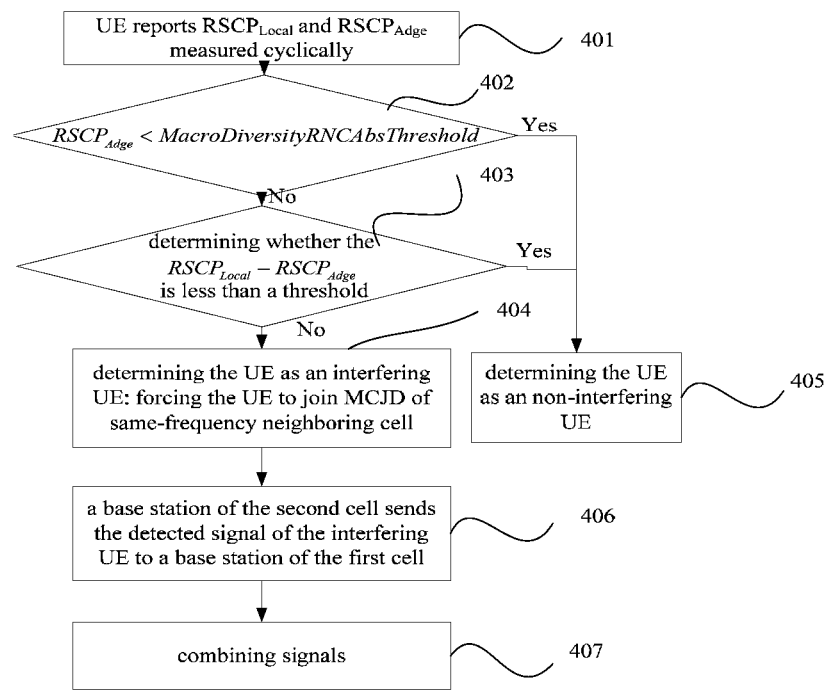
FIG. 4 is a flowchart illustrating the embodiment I of the method provided in the present disclosure.

When the signal combination is performed in the base station of the first cell 303, the complete steps of the method provided in the present disclosure are described in details using a more specific process below in conjunction with FIG. 3, FIG. 4 and the aforementioned description process:

401: as an alternative step, an RNC 301 informs UE 304 of cyclically measuring and reporting RSCP;

the RSCP is received signal code powers of the signal from the base station of the second cell 302, measured by the UE 304. In the presence of a plurality of second cells 302, the UE 304 must report the RSCP to the base station of each second cell 302, and the base station of each second cell 302 will send the received RSCP to the RNC 301.

402: more preferably, the RNC 301 selects the one with the maximum value from the RSCPs, wherein in order to describe conveniently, the one with the maximum value is named as $RSCP_{Adge}$. In this embodiment, the signals of the UE 304 of the serving cell, detected by the base station of the second cell 302 corresponding to the $RSCP_{Adge}$, are sent to the base station of the first cell 303. The base station of the first cell 303 combines them with the signals of the UE 304 of the serving cell detected by the base station of the first cell 303.

More preferably, when the RNC 301 finds that the $RSCP_{Adge}$ of the RSCPs is less than the threshold MacroDiversityRNCAbsThreshod preset in the RNC 301, namely:

$RSCP_{Adge}$<MacroDiversityRNCAbsThreshold, then it is considered that the UE 304 corresponding to the $RSCP_{Adge}$ is not the interfering UE of the second cell 302, and the base station of the first cell 303 does not combine the signals of the UE 304 detected by the base station of the second cell 302.

If the RNC 301 finds that the maximum value $RSCP_{Adge}$ of the RSCPs is more than or equal to the threshold MacroDiversityRNCAbsThreshod, namely:

$RSCP_{Adge}$≥MacroDiversityRNCAbsThreshold, then it is considered that the UE 304 corresponding to the $RSCP_{Adge}$ is the interfering UE of the second cell 302, and a next step 403 is performed:

403: in the present embodiment, suppose that the RSCP of the signal which is from the base station of the first cell 303 and is received by the UE 304 is $RSCP_{Local}$, the RNC will receive the $RSCP_{Local}$ forwarded by the base station of the first cell 303 likewise. The RNC 301 judges RSCP difference MacroDiversityLoss between the $RSCP_{Local}$ and the $RSCP_{Adge}$, namely MacroDiversityLoss=$RSCP_{Local}$-$RSCP_{Adge}$. If MacroDiversityLoss≤MacroDiversityLossThreshold, as shown in step 405, the UE 304 of the serving cell is not the interfering UE of the second cell 302, and the base station of the first cell 303 will not combine the signals of the UE 304 detected by the base station of the second cell 302.

In step 403, if the RNC 301 judges that the RSCP difference MacroDiversityLoss between the $RSCP_{Adge}$ and the $RSCP_{Adge}$ is more than MacroDiversityRNCAbsThreshod, the UE 304 of the serving cell is determined to be the interfering UE of the second cell 302.

404: the RNC 301 determines the UE 304 as the interfering UE, and the base station of the second cell 302 detects the signals of the interfering UE 304.

406: the signals of the UE 304, detected by the base station of the second cell 302 corresponding to the $RSCP_{Adge}$, are sent to the base station of the first cell 303;

407: the base station of the first cell 303 combines the received signals of the UE 304 sent by the base station of the second cell 302 with the signals of the UE 304 detected by the base station of the first cell 303;

the combined signals may be packaged into a frame and then sent to the RNC.

In the present embodiment, the UE abovementioned is 304 in FIG. 3, the serving cell of the UE is the first cell 303; and the same-frequency neighboring cell of the first cell 303 is the second cell 302 in FIG. 3.

Embodiment II

Figure 5:
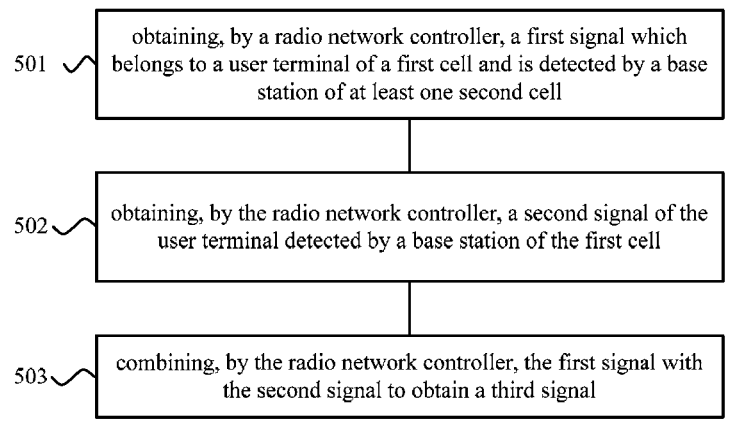
FIG. 5 is a flowchart illustrating an embodiment of the method for improving signal quality provided in the present disclosure.

The embodiment provides a method for improving signal quality, as shown in FIG. 5, including:

step 501: an RNC obtains a first signal which belongs to a user terminal of a first cell and is detected by a base station of at least one second cell;

step 502: the RNC obtains a second signal of the user terminal detected by a base station of the first cell;

step 503: the RNC combines the first signal with the second signal to obtain a third signal.

The number of the second cells may be two or more, and the RNC combines the first signal with the second signal to obtain the third signal, including:

alternatively, the RNC combines the signal with the highest signal strength in the obtained first signals which belong to the user terminal of the first cell and are detected by the base stations of all the second cells with the second signal to obtain the third signal.

The RNC combines the maximum value in the obtained first signals which belong to one user terminal of the first cell and are detected by the base stations of all the second cells with the second signal to obtain the third signal, including:

the RNC receives the RSCP sent by the base station of each neighboring second cell, wherein the RSCP is received signal code power measured when the user terminal receives the signal sent by the base station of each second cell;

the one with the maximum value from the RSCPs sent by the base stations of all the second cells is selected, and in order to describe conveniently, the one with the maximum value is named as $RSCP_{Adge}$ below; and the signal of the user terminal, which is detected by the base station of the second cell corresponding to the $RSCP_{Adge}$ and serves as the first signal, is combined with the second signal to obtain the third signal.

The base station of the first cell and the base station of at least one second cell obtain the second signal and the first signal of the user terminal through MCJD respectively.

The second cells are all neighboring cells with the same frequency as the first cell.

Figure 6:
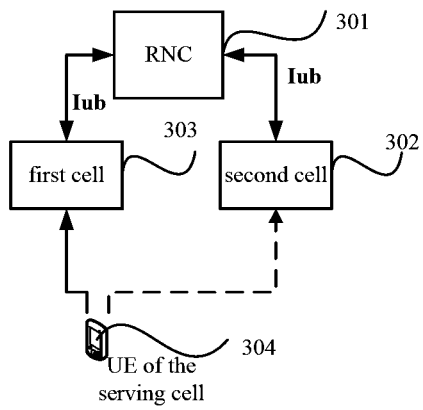
FIG. 6 is a principle schematic view illustrating the embodiment II of the method provided in the present disclosure.

As shown in FIG. 6, in the present embodiment, suppose that the first cell 303 is a serving cell of UE 304, the second cell 302 is a same-frequency neighboring cell of the first cell 303, and the second cell here may include one or more cell. In order to understand conveniently, only one second cell is taken as an example for illustration in this embodiment, and the signals of the UE 304 may reach the base station to which the second cell 302 belongs. The base station of the second cell 302 may receive not only the signals of the UE in the second cell but also the signals from the UE 304 in the first cell. Therefore, for the second cell 302, the UE 304 is an interfering UE of the second cell 302, and the base station of the second cell 302 will obtain the signals of the UE 304 through MCJD.

The base station of the first cell 303 also can obtain the signals of the UE 304 through MCJD. Thus, through combining the signals of the UE 304, obtained by the base station of the second cell 302 and the base station of the first cell 303, the signal quality of the UE 304 can be improved.

In the presence of a plurality of same-frequency neighboring cells, namely a plurality of second cells 302 adjacent to the first cell 303, the signal of the UE 304 received by the base station of each second cell 302 may be detected by the base station of the second cell 302 through MCJD, and through combining the signals of the UE 304 detected by the base stations of all the second cells 302 with the signals detected by the base station of the first cell 303, the signal quality of the UE 304 may be improved.

The method described in the present embodiment may be performed by the RNC or other network entities with similar functions as the RNC. The first cell and the second cell may belong to the same base station or different base stations.

In the present embodiment, in the presence of a plurality of second cells 302, all of the base stations of these second cells 302 may receive the signals from the UE 304 of the serving cell, and the UE 304 may also receive the signals sent by the base stations of the second cells 302 and measure the RSCP of the signals from the base stations of the second cells 302. The UE 304 may send the measured RSCP to the corresponding base station of each second cell 302, and the base stations of the second cells 302 will send the received RSCPs to the RNC. The RNC may select the RSCP with the maximum value, named as $RSCP_{Adge}$ for describing conveniently, according to the received RSCPs, and combine the signal of the UE 304 detected by the base station of the second cell 302 corresponding to the $RSCP_{Adge}$ with the signal from the UE 304 of the serving cell detected by the base station of the first cell 303. In this way, the signals of the UE 304 of the serving cell detected by the base stations of those second cells 302 which receive weak signals of the UE 304 of the serving cell are abandoned, so that the calculation quantity during combining is reduced.

Information of a plurality of same-frequency neighboring cells, namely information of second cells adjacent to the first cell and with the same frequency as the first cell, may be configured for the first cell.

The RNC configures same-frequency neighboring cell information for the first cell 303, and the same-frequency neighboring cell information includes neighboring cell code tree information, indication information for indicating code tree resources occupied by neighboring cell users and neighboring cell scrambling code information.

Figure 7:
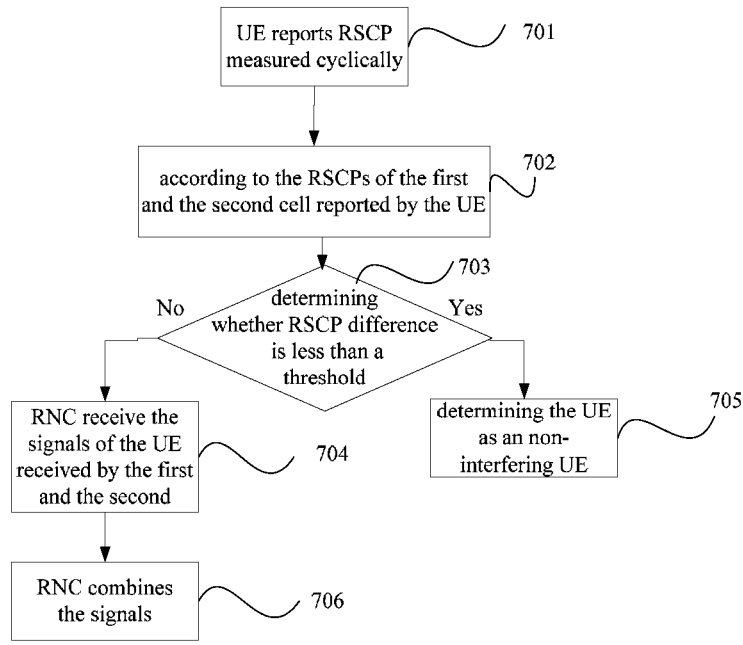
FIG. 7 is a flowchart illustrating the embodiment II of the method provided in the present disclosure.

When the signals are combined by the RNC, the complete steps of the method provided in the present disclosure are described in details using a more specific process below in conjunction with FIG. 6, FIG. 7 and the aforementioned description process:

701: as an alternative step, the RNC 301 informs the UE 304 of cyclically measuring and reporting RSCP;

the RSCP is received signal code power of the signal from the base station of the second cell 302, measured by the UE 304. In the presence of a plurality of second cells 302, the UE 304 must report the RSCP to the base station of each second cell 302, and the base station of the second cell 302 will send the received RSCP to the RNC 301.

In the present embodiment, if the RSCP of the signal which is from the base station of the first cell 303 and is received by the UE 304 is $RSCP_{Local}$, the RNC will receive the $RSCP_{Local}$ forwarded by the base station of the first cell 303 likewise.

702: according to the $RSCP_{Local}$ and the $RSCP_{Adge}$ reported by the UE 304, the RNC 501 calculates the RSCP difference MacroDiversityLoss between the $RSCP_{Local}$ and the $RSCP_{Adge}$, namely MacroDiversityLoss=$RSCP_{Local}$−$RSCP_{Adge}$;

703: the RNC 301 judges the RSCP difference MacroDiversityLoss between the $RSCP_{Local}$ and the $RSCP_{Adge}$, namely MacroDiversityLoss=$RSCP_{Local}$−$RSCP_{Adge}$; if MacroDiversityLoss≤MacroDiversityLossThreshold, as shown in step 705, it is determined that the UE 304 of the serving cell is not the interfering UE of the second cell 302, and the base station of the first cell 303 does not combine the signal of the UE 304 detected by the base station of the second cell 302.

In step 703, if the RNC 301 judges that the RSCP difference MacroDiversityLoss between the $RSCP_{Local}$ and the $RSCP_{Adge}$ is more than MacroDiversityRNCAbsThreshold, the UE 304 of the serving cell is determined to be the interfering UE of the second cell 302;

704: if the UE 304 is judged as the interfering UE, the base station of the second cell 302 detects the signal of the interfering UE 304, and the RNC 301 receives the signal of the UE 304 detected by the base station of the first cell 302 and the signal of the UE 304 detected by the base station of the second cell 303;

706: the RNC 301 combines the aforementioned signals.

Preferably, the RNC 301 selects the one with the maximum value from the RSCPs, named as $RSCP_{Adge}$ here for describing conveniently. In this embodiment, the signal of the UE 304 of the serving cell detected by the base station of the second cell 302 corresponding to the $RSCP_{Adge}$ is combined with the signal of the UE 304 of the serving cell detected by the base station of the first cell 303.

More preferably, when the RNC 301 discovers that the $RSCP_{Adge}$ of the RSCPs is less than the threshold MacroDiversityRNCAbsThreshod preset in the RNC 301, namely:

$RSCP_{Adge}$<MacroDiversityRNCAbsThreshold, then it is considered that the UE 304 corresponding to the $RSCP_{Adge}$ is not the interfering UE of the second cell 302, and the base station of the first cell 303 does not combine the signal of the UE 304 detected by the base station of the second cell 302.

If the RNC 301 finds that the maximum value $RSCP_{Adge}$ of the RSCPs is more than or equal to the threshold MacroDiversityRNCAbsThreshold preset in the RNC 301, namely:

$RSCP_{Adge}$≥MacroDiversityRNCAbsThreshold, then it is considered that the UE 304 corresponding to the $RSCP_{Adge}$ is the interfering UE of the second cell 302, and a next step is performed.

In the present embodiment, the UE abovementioned is 304 in FIG. 6, and the serving cell of the UE is the first cell 303; and the same-frequency neighboring cell of the first cell 303 is the second cell 302 in FIG. 6.

Embodiment III

Figure 8:
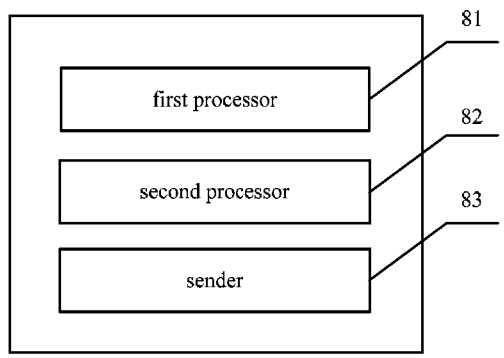
FIG. 8 is a forming principle block diagram illustrating the device of network signal quality provided in the present disclosure.

The present disclosure provides a device for improving signal quality, as shown in FIG. 8, including:

a first processor 81, used for obtaining a first signal which belongs to a user terminal of a first cell and is detected by a base station of at least one second cell;

a second processor 82, used for combining the first signal with a second signal of the user terminal detected by a base station of the first cell to obtain a third signal; and a sender 83, used for sending the third signal to a radio network controller.

Preferably, the device may also include a third processor, used for obtaining the maximum value of the signals detected by the base stations of all the second cells and taking the signal corresponding to the maximum value as the first signal.

Preferably, the device also includes a fourth processor, used for obtaining the second signal of the user terminal through MCJD.

Preferably, the device also includes a fifth processor, used for packaging the third signal into a frame and then sending it to the radio network controller.

The device for improving the signal quality is the base station of the first cell or other entities except the base station of the first cell and the radio network controller.

Embodiment IV

Figure 9:
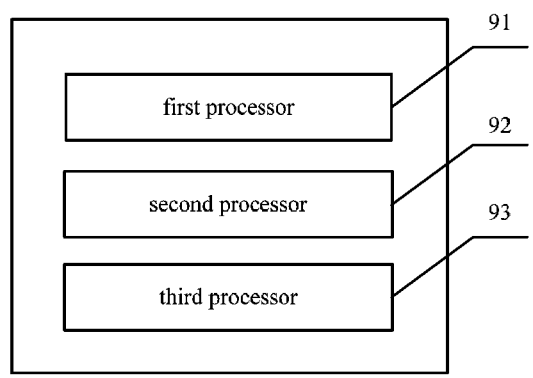
FIG. 9 is a forming principle block diagram illustrating an embodiment of the radio network controller provided in the present disclosure.

The present disclosure also provides a radio network controller, as shown in FIG. 9, including:

a first processor 91, used for obtaining a first signal which belongs to a user terminal of a first cell and is detected by a base station of at least one second cell, and a second signal of the user terminal detected by a base station of the first cell; and a second processor 92, used for combining the first signal with the second signal to obtain a third signal.

Preferably, the radio network controller also includes a third processor 93, used for obtaining the signal with the highest signal strength in the signals of the user terminal detected by the base stations of all the second cells and taking the signal with the highest signal strength as the first signal.

Preferably, the radio network controller also includes a receiver, used for receiving the RSCP sent by the base station of each neighboring second cell, wherein the RSCP is received signal code power measured when the user terminal receives the signal sent by the base station of each second cell;

alternatively, the radio network controller also includes a fourth processor, used for selecting the one with the maximum value, named as $RSCP_{Adge}$, from the RSCPs sent by the base stations of all the second cells.

Embodiment V

Figure 10:
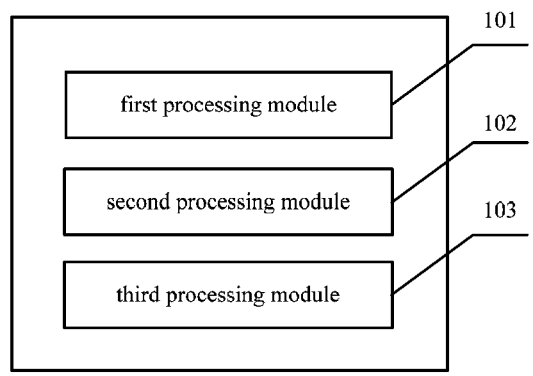
FIG. 10 is a forming principle block diagram illustrating an embodiment of the chip provided in the present disclosure.

The present disclosure provides a chip, as shown in FIG. 10, including:

a first processing module 101, used for obtaining a first signal which belongs to a user terminal of a first cell and is detected by a base station of at least one second cell, and a second signal of the user terminal detected by a base station of the first cell; and a second processing module 102, used for combining the first signal with the second signal to obtain a third signal.

Preferably, the chip also includes a third processing module 103, used for obtaining the signal with the highest signal strength in the signals of the user terminal detected by the base stations of all the second cells and taking the signal with the highest signal strength as the first signal.

Preferably, the chip also includes a fourth processing module, used for packaging the third signal into a frame and then sending it to the radio network controller.

Through the description of the embodiments above, those ordinary skilled in the art may clearly realize that the present disclosure may be realized by means of software and necessary general hardware, of course, may be realized through hardware, but the former is for better embodiments under many conditions. Based on such an understanding, the technical solution of the present disclosure substantially or the part of the present disclosure making contribution to the prior art may be embodied in the form of a software product, and the computer software product is stored in a storage medium such as soft disk, hard disk or optical disk of a computer, which includes a plurality of instructions enabling computer equipment (which may be a personal computer, a server, or network equipment and the like) to execute the method provided in each embodiment of the present disclosure.

The description above is only for specific embodiments of the present disclosure, without limited to the protection scope of the present disclosure. It is easily conceived to the person skilled in the art to make alterations or substitutions within the technical scope disclosed by the present disclosure, which should fall in the protection scope of the present disclosure. Therefore, the protection scope of the present disclosure should be defined by that of the claims.

What is claimed is:

1. A method for improving signal quality, comprising:
obtaining a first signal which belongs to a user terminal of a first cell and is detected by a base station of at least one second cell;
combining the first signal with a second signal of the user terminal detected by a base station of the first cell to obtain a third signal; and
sending the third signal to a radio network controller,
wherein a number of the second cells is more than one, and the combining the first signal with a second signal of the user terminal detected by a base station of the first cell to obtain a third signal comprises:
combining a signal with the highest signal strength in the first signals detected by the base stations of all the second cells with the second signal to obtain the third signal,
wherein the combining a signal with the highest signal strength in the first signals detected by the base stations of all the second cells with the second signal to obtain the third signal comprises:
receiving a $RSCP_{Adge}$ sent by the radio network controller, wherein the $RSCP_{Adge}$ is a received signal code power (RSCP) with a maximum value selected, by the radio network controller, from RSCPs sent by the base stations of all the second cells, and each RSCP is a received signal code power measured when the user terminal receives the signal sent by the base station of each second cell; and
combining a signal of the user terminal, which is detected by a base station of a second cell corresponding to the $RSCP_{Adge}$ and serves as the first signal, with the second signal to obtain the third signal.

2. The method according to claim 1, wherein:
the base station of the first cell and the base station of at least one second cell obtain the second signal and the first signal of the user terminal through multi-cell joint detection (MCJD) respectively.

3. A method for improving signal quality, comprising:
obtaining, by a radio network controller, a first signal which belongs to a user terminal of a first cell and is detected by a base station of at least one second cell;
obtaining, by the radio network controller, a second signal of the user terminal detected by a base station of the first cell; and
combining, by the radio network controller, the first signal with the second signal to obtain a third signal,
wherein a number of the second cells is more than one and the combining by the radio network controller, the first signal with the second signal to obtain a third signal, comprises:
combining, by the radio network controller, a signal with the highest signal strength in the obtained first signals which belong to the user terminal of the first cell and are detected by the base stations of all the second cells with the second signal to obtain the third signal,
wherein the combining, by the radio network controller, a signal with the highest signal strength in the obtained first signals which belong to the user terminal of the first cell and are detected by the base stations of all the second cells with the second signal to obtain the third signal, comprises:
receiving, by the radio network controller, a received signal code power (RSCP) sent by the base station of each neighboring second cell, wherein the RSCP is a received signal code power measured when the user terminal receives the signal sent by the base station of each second cell;
selecting, by the radio network controller, a RSCP with a maximum value from the RSCPs sent by the base stations of all the second cells, which is marked as $RSCP_{Adge}$; and
combining, by the radio network controller, a signal of the user terminal, which is detected by a base station of a second cell corresponding to the $RSCP_{Adge}$ and serves as the first signal, with the second signal to obtain the third signal.

4. The method according to claim 3, wherein the base station of the first cell and the base station of at least one second cell obtain the second signal and the first signal of the user terminal through multi-cell joint detection (MCJD) respectively.

5. A device for improving signal quality, comprising:
a first processor, configured to obtain a first signal which belongs to a user terminal of a first cell and is detected by a base station of at least one second cell;
a second processor, configured to combine the first signal with a second signal of the user terminal detected by a base station of the first cell to obtain a third signal; and
a sender, configured to send the third signal to a radio network controller,
wherein the number of the second cells is two or more, and the device comprises a third processor used for:
receiving $RSCP_{Adge}$ sent by the radio network controller, wherein the $RSCP_{Adge}$ is a one with the maximum value selected, by the radio network controller, from received signal code powers, RSCPs, sent by the base stations of all the second cells, and the RSCP is received signal code power measured when the user terminal receives the signal sent by the base station of each second cell; and
obtaining a signal of the user terminal, which is detected by a base station of a second cell corresponding to the $RSCP_{Adge}$ and taking the signal corresponding to the $RSCP_{Adge}$ as the first signal.

6. The device according to claim 5, further comprising:

a fourth processor, configured to obtain the second signal of the user terminal through multi-cell joint detection (MCJD).

7. The device according to claim 5, further comprising:

a fifth processor, configured to package the third signal into a frame and send the packaged third signal to the radio network controller.

8. The device according to claim 5, wherein the device for improving the signal quality is one of the following; the base station of the first cell and other entities except the base station of the first cell and the radio network controller.

9. A radio network controller, comprising:

a first processor, configured to obtain a first signal which belongs to a user terminal of a first cell and is detected by a base station of at least one second cell, and a second signal of the user terminal detected by a base station of the first cell; and a second processor, configured to combine the first signal with the second signal to obtain a third signal;

a third processor, configured to obtain a signal with the highest signal strength in the signals of the user terminal detected by the base stations of all the second cells and use the signal with the highest signal strength as the first signal;

a receiver, configured to receive a received signal code power (RSCP) sent by the base station of each neighboring second cell, wherein the RSCP is a received signal code power measured when the user terminal receives the signal sent by the base station of each second cell; and a fourth processor, configured to select a RSCP with the maximum value, named as $RSCP_{Adge}$, from the RSCPs sent by the base stations of all the second cells.

* * * * *